United States Patent [19]
Lawerman

[11] Patent Number: 5,890,168
[45] Date of Patent: Mar. 30, 1999

[54] SYSTEM WITH DATA REPETITION BETWEEN LOGICALLY SUCCESSIVE CLUSTERS

[75] Inventor: Edzer Lawerman, Eindhoven, Netherlands

[73] Assignee: U.S. Philips Corporation, New York, N.Y.

[21] Appl. No.: 678,217

[22] Filed: Jul. 11, 1996

[30] Foreign Application Priority Data

Jul. 13, 1995 [EP] European Pat. Off. .............. 95201927

[51] Int. Cl.⁶ ................................................... G06F 17/30
[52] U.S. Cl. ........................... 707/205; 707/200; 369/48; 369/49
[58] Field of Search ..................................... 707/205, 200, 707/201; 369/48, 49, 50, 58, 59, 60

[56] References Cited

U.S. PATENT DOCUMENTS

| | | | |
|---|---|---|---|
| 5,029,125 | 6/1991 | Sciupac | 364/900 |
| 5,243,588 | 9/1993 | Maeda et al. | 369/54 |
| 5,321,824 | 6/1994 | Burke | 369/48 |
| 5,353,276 | 10/1994 | Schroder | 369/275.1 |
| 5,363,362 | 11/1994 | Maeda et al. | 369/48 |
| 5,422,762 | 6/1995 | Jerbic | 360/48 |
| 5,457,658 | 10/1995 | Niijima et al. | 365/218 |
| 5,481,519 | 1/1996 | Hosoya | 369/58 |
| 5,544,356 | 8/1996 | Robinson et al. | 395/600 |
| 5,551,020 | 8/1996 | Flax et al. | 395/600 |
| 5,552,896 | 9/1996 | Yoshida | 358/342 |
| 5,574,907 | 11/1996 | Jernigan, IV et al. | 395/601 |
| 5,598,370 | 1/1997 | Niijima et al. | 365/185.33 |
| 5,608,901 | 3/1997 | Letwin | 395/621 |

FOREIGN PATENT DOCUMENTS

| | | | |
|---|---|---|---|
| 0625858 | 11/1994 | European Pat. Off. | G06F 17/30 |
| 9114265 | 9/1991 | WIPO | G06F 17/30 |
| WO9114265 | 9/1991 | WIPO . | |

OTHER PUBLICATIONS

Bassias et al. "Coherent Signal–Subspace Processing in a Sector" IEEE Transactions on Systems, Man and Cybernetics, vol. 21, No. 5, Sep./Oct. 1991, pp. 1088–1100.

Primary Examiner—Wayne Amsbury
Assistant Examiner—Michael J. Wallace, Jr.
Attorney, Agent, or Firm—Bernard Franzblau

[57] ABSTRACT

In a multimedia system, such as a video-on-demand server, a file with data is stored in a series of successive clusters which may be distributed across the disc. A cluster consists of physically successive sectors which can be read in blocks by a user application. By repeating a part of the data at the end of a cluster at the beginning of the next cluster, the system enables reading of a block of sectors from an arbitrary sector, said block and the subsequent blocks nevertheless being accessible by way of one seek operation. The interactive response time is thus substantially improved in situations in which the user requests an arbitrary data fragment.

11 Claims, 6 Drawing Sheets

SYSTEM WITH DATA REPETITION BETWEEN LOGICALLY SUCCESSIVE CLUSTERS

BACKGROUND OF THE INVENTION

This invention relates to a method of storing data in a file, the file being composed of a series of logically successive clusters, data sectors in a cluster being stored one-to-one in physically successive storage sectors of the cluster.

The invention also relates to a system for storing data in a file, which system comprises a file system for storing the file which comprises a series of logically successive clusters, data sectors in each cluster being stored one-to-one in physically successive storage sectors of the cluster.

The invention also relates to an information carrier provided with a file with data, which file comprises a series of logically successive clusters, data sectors in each cluster being stored one-to-one in physically successive storage sectors of the cluster.

The invention also relates to a method of fetching data from a file which comprises a logically successive series of clusters, data sectors in each cluster being stored one-to-one in physically successive storage sectors of the cluster, the storage sectors in a given cluster being read by blocks in order to fetch each time some of the data sectors.

The invention also relates to a system for making data available to a user, the system comprising a file system for managing a file which comprises a series of logically successive clusters, data sectors in each cluster being stored one-to-one in physically successive storage sectors of the cluster.

Such a system for making data available to a user is known for so-called video-on-demand servers. A server of this kind comprises one or more discs on which files are stored. A file then contains a film which the server presents to a user on demand. In the known system a file comprises a number of clusters which have a logic order and which may be distributed on the disc. A cluster comprises physically successive sectors with the data of the file. The sectors with the data of the file are fetched from the disc by blocks so as to be placed in a buffer wherefrom the data are presented to the user at a rate which corresponds to the timing of the film. The size of a block equals the size of the buffer, so that the buffer is always completely filled. The system has two buffers for a user: while the first buffer is filled with data being presented to the user, the second buffer is available so as to be filled with the next block from the disc. The cycle of the scheduler of the system is such that the next block is present in the second buffer before all of the data in the first buffer have been presented. At that instant the first and the second buffer change functions and the process is repeated. Fetching a block for the buffer in the known system generally requires one seek operation by the head on the disc, because the sectors to be fetched are physically successively arranged in the cluster. The length of each cluster is a multiple of the length of the block, so that the last block of a cluster can also be fetched by way of one seek operation.

The known system has a number of possibilities for interaction whereby the user can control the showing of the relevant movie, for example fast showing of the film or jumping to a given point in the film. Consequently, at a given instant the user may demand data which commence at an arbitrary position within a cluster. The starting position of a block within a cluster, however, can be chosen to be situated only in a position amounting to a multiple of the size of the block so that it is ensured that the remaining part of the cluster can be read in an integer number of blocks. The block containing the demanded data is fetched and arranged in the first user buffer. Because of the restrictions imposed as regards the starting position of this block, the block will often contain an amount of data preceding the demanded data. Because in that case the buffer only partly contained data to be presented to the user, there is a risk of the buffer becoming empty before the scheduler has executed the next cycle. Therefore, before the user receives the demanded data, the system fetches not only the block containing the relevant data but also the next block and places the latter block in the second buffer. The presentation of the buffered data to the user commences only after that. Consequently, the scheduler must execute two cycles between the instant at which the user demands the data and the instant at which the user receives the data. This imposes a long waiting period for the user.

SUMMARY OF THE INVENTION

It is inter alia, an object of the invention to provide a method and a system of the kind set forth for making data available to a user with improved data accessibility. To this end, the method in accordance with the invention is characterized in that it comprises:

reading a first block of storage sectors as from a desired storage sector, detecting the number of storage sectors remaining between the end of the first block and the end of the relevant cluster, and jumping to a next desired storage sector in the logically next cluster if the number of storage sectors remaining is smaller than the number of storage sectors to be read in a next block, the system in accordance with the invention being characterized in that the file system is arranged to manage the file in which the data sectors in the last K storage sectors of a given cluster correspond to the data sectors in the first K storage sectors of a cluster succeeding the given cluster. Because some of the data sectors in the storage sectors at the end of a cluster are repeated at the beginning of the next cluster, a block of data sectors to be fetched may commence at an arbitrary sector in the cluster, it nevertheless being possible to fetch the relevant block and the subsequent blocks after one seek operation on the storage medium. This enables more flexible reading of the data from the file.

An embodiment of the system in accordance with the invention is characterized in that the read means are arranged to read a first block of storage sectors as from a desired storage sector, the system comprising:

a detector for detecting the number of storage sectors remaining between the end of the first block and the end of the relevant cluster, and a jumping means for jumping to a next desired storage sector in the logically next cluster if the number of storage sectors remaining is smaller than the number of storage sectors to be read in a next block.

Because the first block of data sectors fetched after a jump commences exactly at the beginning of the desired data, the data sectors of this block can be presented directly to the user. It is no longer necessary to fetch a second block of data sectors first. As a result, after having issued a jump command, the user need not wait so long until the data arrive.

An embodiment of the system in accordance with the invention is characterized in that the capacity of the buffer, expressed as a number of data sectors, at the most equals K+1. The size of the block of data sectors to be fetched can be accurately adapted to the relevant circumstances in accordance with the invention. Because a block may commence at an arbitrary position, it is no longer necessary to choose the size of the block as a divisor of the cluster size as in the case in the known system. Thanks to the repetition of the data sectors in accordance with the invention, a block may commence at an arbitrary position in a cluster, it nevertheless being possible to fetch said block and any subsequent block by way of one seek operation.

It is a further object of the invention to provide a method and system of the kind set forth for the storage of data in a file with improved data accessibility. To this end, the method in accordance with the invention is characterized in that the data sectors stored in the last K storage sectors of a given cluster are repeated in the first K storage sectors of a second cluster which directly succeeds the given cluster, and the system in accordance with the invention is characterized in that the file system is arranged to repeat the data sectors stored in the last K storage sectors of a given cluster in the first K storage sectors of a second cluster which succeeds the given cluster. Because the data sectors in the storage sectors of a last part of a cluster are repeated at the beginning of the next cluster, the accessibility of the data in the file is enhanced. The reading of blocks of data sectors from the file may commence at an arbitrary position, it nevertheless being possible to fetch each block from the disc by way of one seek operation.

It is a further object of the invention to provide a storage medium of the kind set forth with improved user accessibility. To this end, the storage medium in accordance with the invention is characterized in that the data sectors in the last K storage sectors of a given cluster correspond to the data sectors in the first K storage sectors of a cluster which succeeds the given cluster. Because of the repetition of the data sectors in the storage sectors of a last part of a cluster at the beginning of the next cluster, the accessibility of the data in the file during use of the storage medium is enhanced. The reading of blocks of data sectors from the file may commence at an arbitrary position, it nevertheless being possible to fetch each block by way of one seek operation on the storage medium.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENTS

Figure 1:
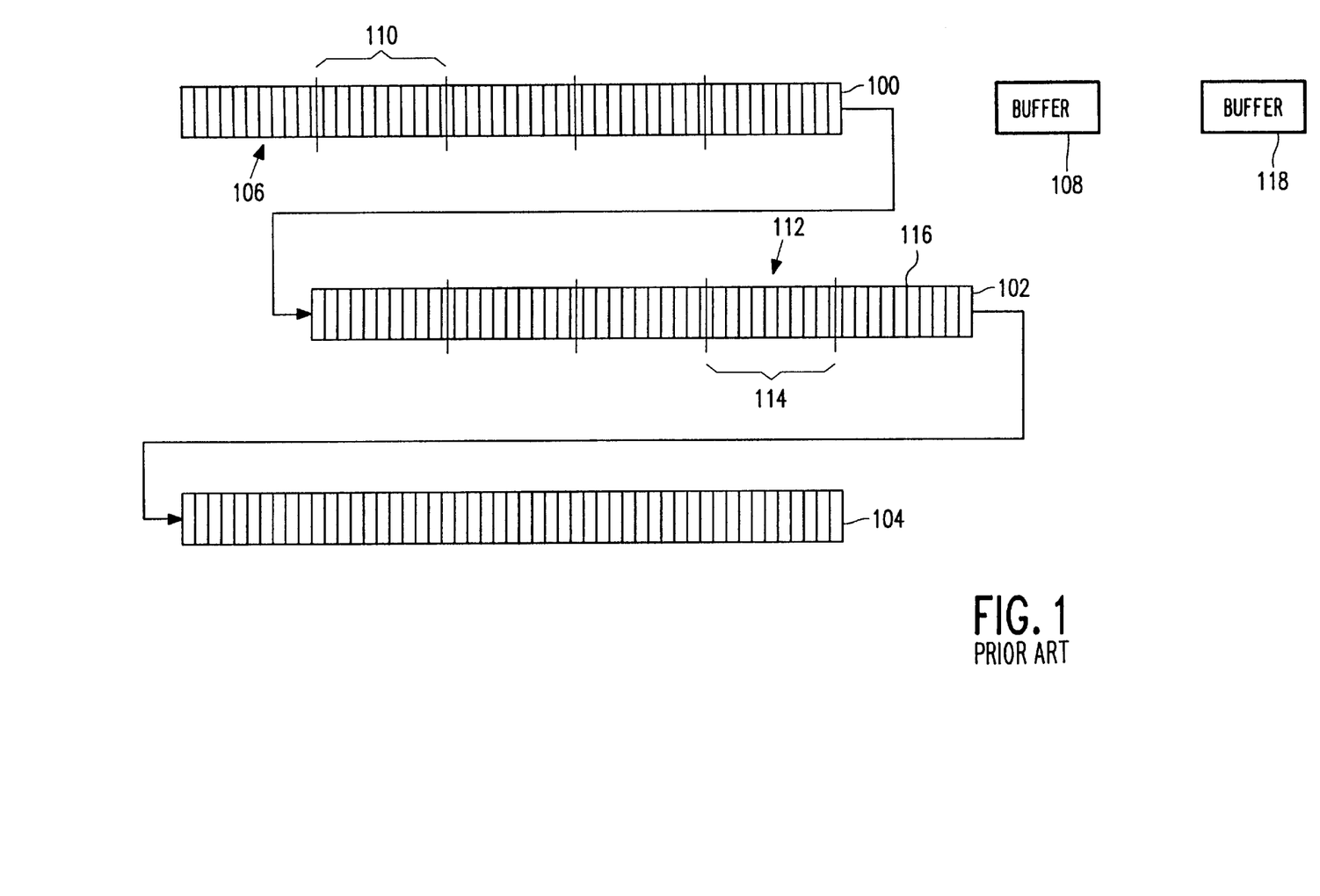
FIG. 1 shows the composition of a file according to the known technique.

FIG. 1 shows the composition of a file in conformity with the known technique. Such a file concerns, for example, a film stored on the disc of a video-on-demand server which is made available to the user on demand. The file comprises a series of clusters, i.e. in this case 100, 102 and 104, each of which comprises a number of sectors, for example the sector 106. The succession of data in the file is of importance for making the data stored available again. The pictures of a film should be made available in a fixed succession during normal reproduction. The sectors in a cluster are stored physically successively, a sector then containing data which precede the data of a next sector from a logical point of view. In many cases the clusters are not stored contiguously, but are distributed across the storage medium. However, they do have a logic order which corresponds to the original order of the data. In the present example the cluster 100 precedes the cluster 102 which itself precedes the cluster 104. In practice the storage medium, for example, a magnetic disc or an optical disc, will contain a varying set of files. In the case of a video-on-demand server, new films will be added and older films will be removed. For efficient management of the space on the storage medium it is decided to subdivide the files of such a varying set into clusters and to store these clusters so as to be distributed across the storage medium. The reading of the data from the file comprises a seek operation for the relevant data on the storage medium and the transfer of the data from the storage medium. In order to achieve adequate reading efficiency, the data are read by blocks, each time the data of a block of successive sectors being read. This data block is then usually stored in a buffer 108 wherefrom the data can be fetched at the desired rate by a user application. A system operating according to this principle has so-called cycles of a given duration within which a block of contiguous sectors is fetched from the storage medium so as to be stored in a buffer for every user requiring such fetching. A block 110 of sectors to be read has a size such that the data of the cluster can be read in an integer number of blocks. Otherwise, reading a part of the cluster then remaining would necessitate a second seek operation so as to fill the buffer with data from the beginning of the next cluster, because the clusters are not stored contiguously. Because of the time required, such a second seek operation is usually unacceptable in real-time systems which present a continuous stream of data to a user.

In a system operating according to the above principle, jumps can be made to an arbitrary sector 112 in the data in the file. The block in which the sector is situated is then determined while taking into account the fact that an integer number of blocks must be read until the end of the cluster. Thus, the known system has a fixed pattern in which the blocks of sectors can be read from a cluster. In the example shown in FIG. 1 the desired sector is situated in block 114 and this block is fetched and stored in the buffer 108. The buffer then contains data which are not required, i.e. the data of the sectors preceding the sector 112 in the block 114. The further presentation of data may then become problematic, because the data in the buffer 108 are used up faster than when the buffer is filled entirely with desired data. As a result, the buffer could become empty before a next block has been fetched for the user. Therefore, in the case of a jump to an arbitrary sector not only the block in which the relevant sector is situated is fetched, but also the subsequent block. The presentation of the data to the user is started only after that. In the example shown in FIG. 1 the block 114 is fetched and stored in the buffer 108 during a first cycle, after which the block 116 is fetched and stored in a further buffer 118 during a second cycle; the presentation of the data in the buffer 108 to the user commences only after that. This means that two cycles expire between the instant at which the user demands the data of a given sector and the instant at which the user receives the data. In the known system the average cycle time is 2 seconds and the maximum cycle time is 6 seconds. Therefore, in the case of a jump there is an average waiting period of 4 seconds and a maximum waiting period of 12 seconds.

Figure 2:
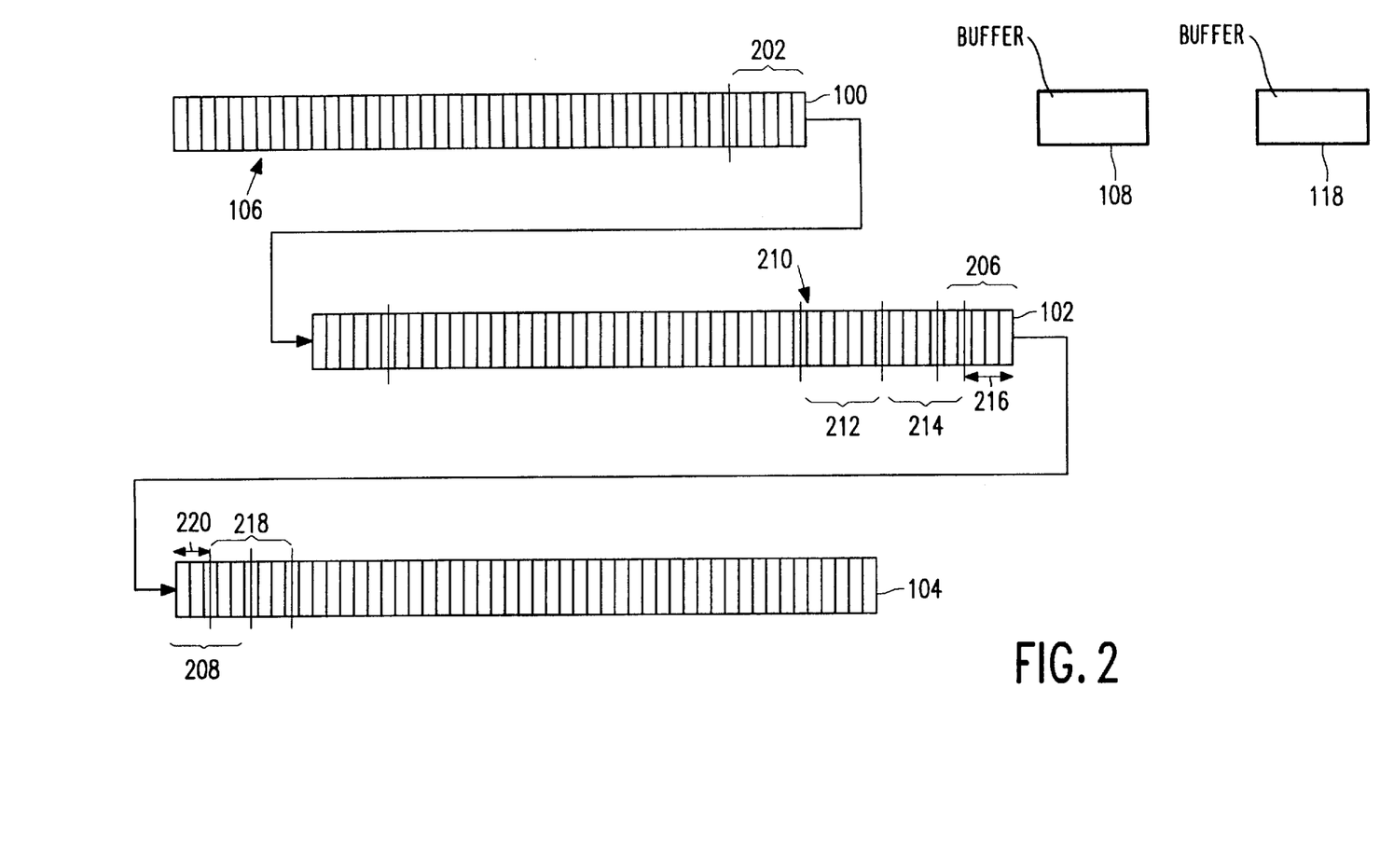
FIG. 2 shows the composition of a file in accordance with the invention.

FIG. 2 shows the composition of a file in accordance with the invention. This file has the known structure with a logic series of clusters 100, 102, 104 which comprise a series of physically successive sectors. In the file in accordance with the invention the data in the last part of a cluster are repeated in the first part of the logically next cluster. The data in the block of sectors 202 correspond to the data in the block of sectors 204 and those in the block 206 to those in the block 208. When the repetition is made at least equal to the maximum buffer capacity minus 1, the fetching of a block of sectors can commence at an arbitrary position within the cluster, it nevertheless always being possible to fetch a block by way of one seek operation. For example, when data are demanded which commence in sector 210, the system fetches a block of sectors 212 which commences at the sector 210 and places it in the buffer 108 so as to be used up by the user. Subsequently, during a next cycle the block 214 is fetched, after which it appears that the remaining part 216 of the cluster 102 is smaller than a block of sectors to be fetched. In that case, subsequent to the block 214, during a next cycle a block 218 is fetched from the next cluster 104, a part 220 of the sectors being skipped because the data corresponding thereto have already been read by way of the block 214. Because of the repetition of data, therefore, after the block 214 it is not necessary to fetch a block which is situated partly within the cluster 102 and partly within the cluster 104. The fetching of such a divided block would imply two seek operations, because the clusters are not stored in a physically successive fashion. This would require a substantial amount of time in comparison with said cycle time of the system. Because the beginning of the block 212 coincides with the beginning of the desired data, after the fetching of this block the buffer will be filled completely with data for use by the user. As a result, the presentation of the data to the user may commence immediately after the storage of the relevant block in the buffer. The time elapsing between the instant at which data are demanded and the instant at which the relevant data are received thus amounts to one cycle only. In comparison with the known system a system utilizing the invention thus halves the maximum waiting time for the user. This can be achieved because in accordance with the invention a block of sectors to be fetched may commence at an arbitrary sector in a cluster, it nevertheless being possible to fetch the relevant block and the subsequent blocks by way of one seek operation on the disc.

Another advantage of the invention relates to the flexibility in respect of the size of a block of sectors to be fetched. In the known system the size of the block should be such that a cluster comprises an integer number of blocks. Thanks to the overlap in accordance with the invention, the size of a block can be accurately adapted to specific circumstances, for example, the size of the user buffer and the rate at which the data are used up by the user. When, during the reading of blocks of a given size, the cluster has been read to such an extent that the remainder is smaller than one block, a next block can be read in its entirety from the next cluster. A requirement imposed as regards the selection of the block size consists in that a block may not be more than 1 sector larger than the number of sectors whose data are repeated. This higher flexibility is particularly attractive for application in a system involving more than one user. Each user can then be allocated a buffer size which is optimum for his own needs as regards rate of use and response time. In a particular embodiment of the system in accordance with the invention a file has a capacity of 1 Gbyte, a cluster a capacity of 10 Mbytes, a block of data sectors to be fetched a capacity of 128 kbytes, and a data sector a capacity of 512 bytes.

Figure 3:
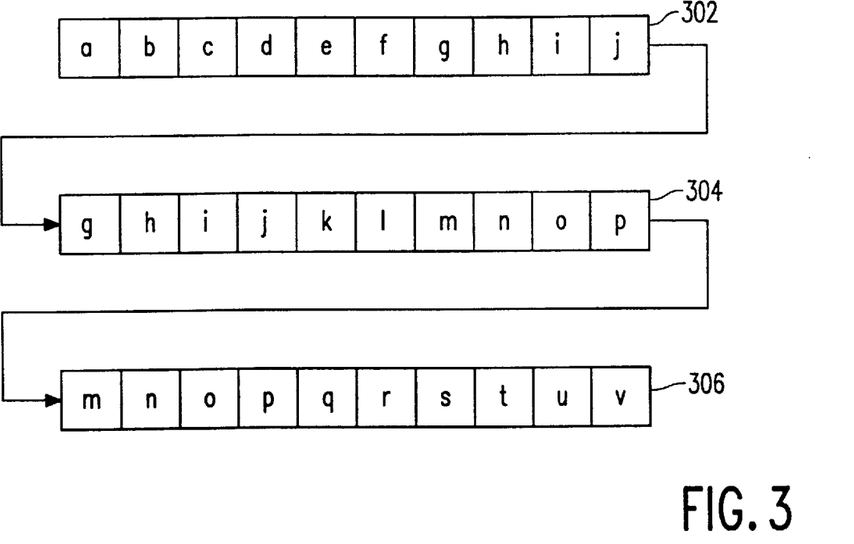
FIG. 3 shows an example of a file comprising 3 clusters, each of which comprises 10 sectors.

FIG. 3 shows an example of a file comprising 3 clusters, each of which comprises 10 sectors. The data of the last 4 sectors of a cluster are repeated in the first 4 sectors of the next cluster. This file can be read with blocks of 5 sectors, starting from an arbitrary sector. For sequential reading of the entire file, blocks having the following position and contents are read:

| | |
|---|---|
| cluster 302, sector 1 | "abcde" |
| cluster 302, sector 6 | "fghij" |
| cluster 304, sector 5 | "klmno" |
| cluster 306, sector 4 | "pqrst" |
| cluster 306, sector 9 | "uv". |

During reading it is established which next sector of a cluster is due to be read with a next block. A next block may be read from the current cluster if the number of sectors from the next sector until the end of the cluster equals at least the block size. A next block should be read from a next cluster if the number of sectors from said next sector until the end of the cluster is less than the block size. In that case the block should commence in the next cluster after an offset of a number of sectors whose data have already been read with the block previously fetched from the previous cluster. If desired, the file can be read with smaller blocks. If the block size amounts to 3 sectors, the file is completely read as follows:

| | |
|---|---|
| cluster 302, sector 1 | "abc" |
| cluster 302, sector 4 | "def" |
| cluster 302, sector 6 | "ghi" |
| cluster 304, sector 4 | "jkl" |

Furthermore, reading may commence with an arbitrary sector in a cluster. As from said arbitrary sector, blocks are then read until the number of sectors remaining in the cluster becomes insufficient. In that case a change-over is made to the next cluster in the described manner.

In a general case where a cluster comprises C sectors, O sectors from the end of a cluster are repeated, a block has a size of B sectors and the next sector to be read is the number, Snr in the cluster, the sectors being successively numbered as from 1, the following rules apply:
if $C-Snr+1 \geq B$, then next block from current cluster
if $C-Snr+1 < B$, then the next block is head from next cluster
$Snr[\text{next cluster}] = O - (C - Snr[\text{current cluster}])$
Therein, Snr[next cluster] is the number of the sector in the next cluster at which the next block should commence.

Figure 4:
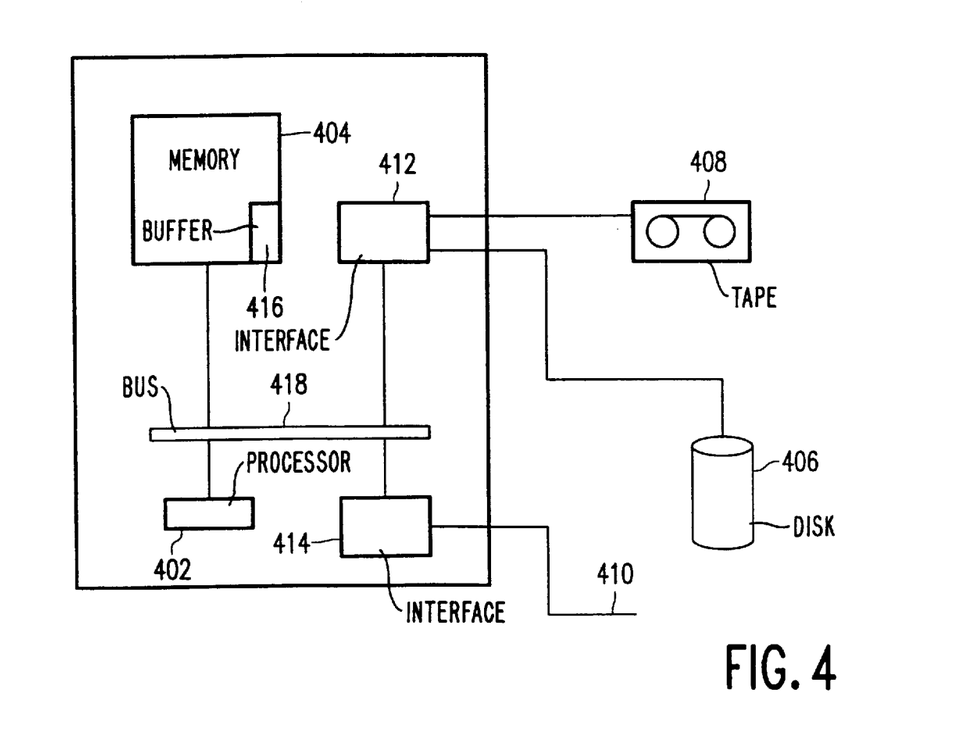
FIG. 4 shows diagrammatically the essential parts of the system in accordance with the invention for storing data in a file.

FIG. 4 shows diagrammatically the most important parts of the system for the storage of data in a file in accordance with the invention. The system is intended to receive data from a given source and to store this data in a file on a storage medium, the file being composed in accordance with the invention as described with reference to the FIGS. 2 and 3. The system is constructed on the basis of a general-purpose computer which is provided with the appropriate programs for this purpose. The system comprises a processor 402 for executing the programs which are loaded into the memory 404 for this purpose. The system also comprises an apparatus with a storage medium for the storage of the file, for example a disc unit with one or more discs 406. The system also comprises apparatus via which the data can be applied to the system. This may take place via a tape 408 and/or a network link 410. However, other apparatus are also feasible. The system comprises an interface section 412 for exchanging data with the disc unit and the tape unit and an interface section 414 for exchanging data with the network connection. The system may also comprise a buffer 416 which is situated in a part of the memory and via which the data can be dispatched from one apparatus to another. The system also comprises a bus 418 for exchanging commands and data between the various parts of the system. A part of the memory 404 stores the so-called file system program which manages the files on the storage medium. Furthermore, the memory stores an application program which reads the data of an apparatus and presents this data to the file system for processing and storage in a file in accordance with the invention.

Figure 5:
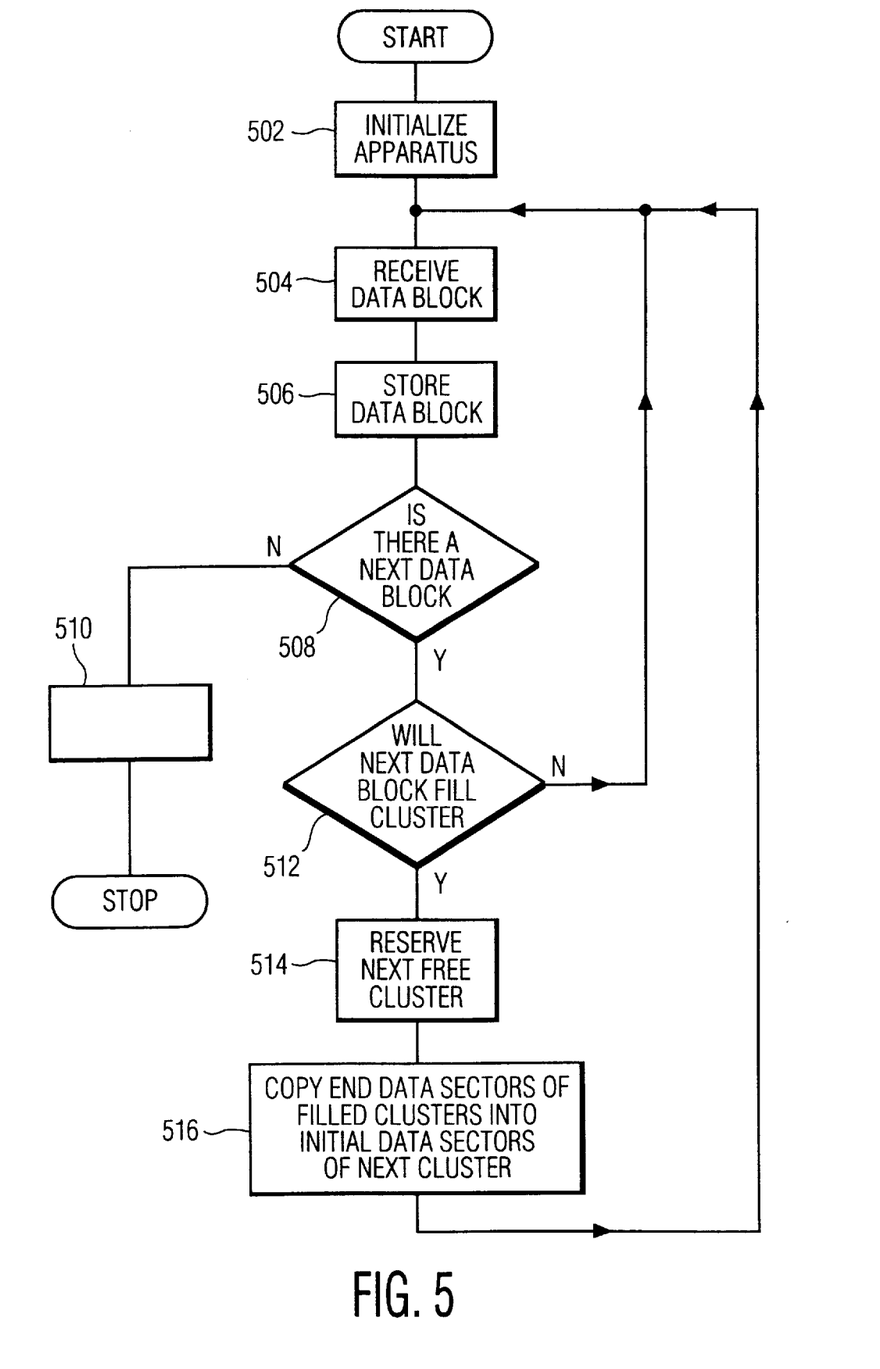
FIG. 5 shows a flow chart illustrating the main steps of the method in accordance with the invention for storing data in a file.

FIG. 5 shows a flow chart with the main steps of the method in accordance with the invention for storing data in a file. During step 502 initialization takes place, during which inter alia the free space on the disc is determined, a file is selected bearing a given name and having a given size for the part to be repeated between the clusters, and the first free cluster is reserved. In step 504 a block with data sectors is received from the application. A data sector is a part of the data having a size such that it can be stored in a sector of a cluster. Such a sector of a cluster will be referred to as a storage sector hereinafter. The block with data sectors is stored in the storage sectors of the current cluster in step 506. Subsequently, in step 508 it is checked whether a next block with data sectors is to be received. If this is not the case, the file is closed in step 510. This may imply inter alia the release of non-used storage sectors of the last cluster. If it is established in step 508 that a next block of data sectors is to be received, it is checked in step 512 whether this block would still fit in the current cluster. If the cluster is not yet full, a return is made to step 504 for receiving the block. The process is then repeated as described above. If step 512 reveals that the cluster is full, in step 514 a next free cluster is reserved and included in the logic series of clusters of the file. Subsequently, in step 516 the data sectors of the selected number of storage sectors of the filled cluster are copied to a corresponding number of storage sectors at the beginning of the new cluster. Subsequently, a return is made to step 504 in order to receive the block with data sectors from the application and to arrange it subsequent to the copied data sectors in the cluster in the step 506. The process is then repeated as described above.

In order to illustrate the principle of the method of the invention in a simple manner it is assumed that a block of data sectors can exactly fill a cluster. This need not be the case in practice. In that case the block is not stored in one step, but the individual storage sectors are filled one by one, it being checked each time whether the cluster is full. If that is the case, the storage of the block is interrupted so as to reserve the next free cluster and to copy the data sectors from the last part of the instantaneous cluster. If desired, copying of the data sectors from the last part of a cluster to the storage sectors of the first part of the next cluster can be postponed. This may be necessary if the stream of blocks of data sectors from the application may not be interrupted, for example in the case of real-time encoding of a video source, and the system is burdened to such an extent that no capacity remains for temporarily copying the desired part in parallel with the reception of the stream. In such a case it suffices to reserve space at the beginning of a cluster and to arrange the block with the data sectors directly therebehind. The copying of the last part of the preceding cluster in the empty space is then performed at a later stage when all blocks of data sectors have been received from the application.

Figure 6:
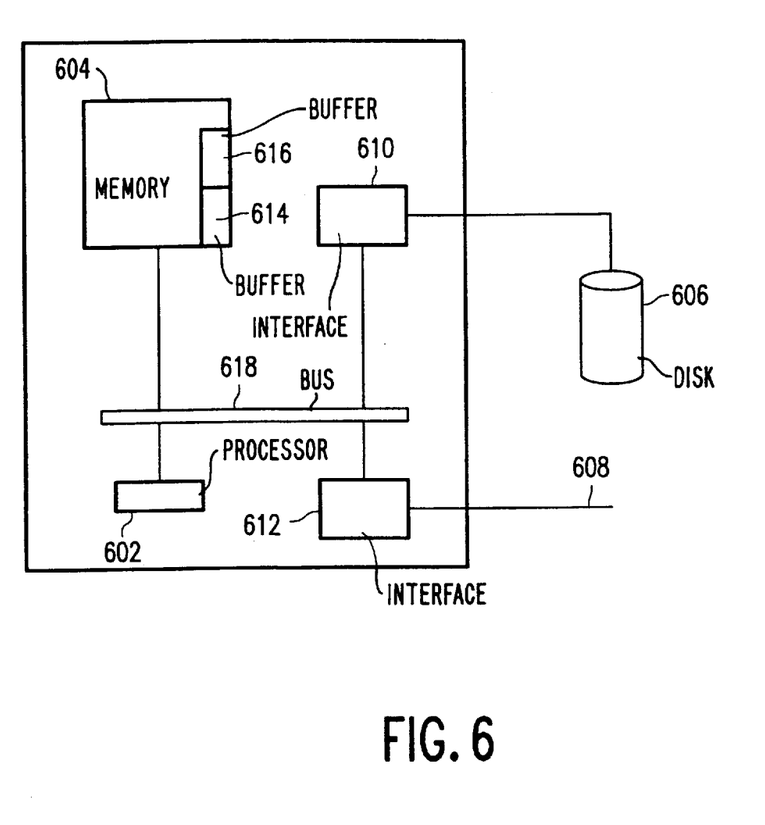
FIG. 6 shows diagrammatically the essential parts of the system in accordance with the invention for making data available to a user.

FIG. 6 shows diagrammatically the most important parts of the system in accordance with the invention for making data available to a user. The system fetches data from a file on a storage medium, the file being composed in accordance with the invention as described with reference to the FIGS. 2 and 3. The system is constructed on the basis of a general-purpose computer which is provided with the appropriate programs for this purpose. The system comprises a processor 602 for executing the programs which are loaded into the memory 604 for this purpose. The system also comprises an apparatus with a storage medium for the storage of the file. Such an apparatus is, for example, a disc unit with one or more discs 606. The system also comprises a connection 608 via which data can be applied to a user. The data can be further processed in a further location, but alternatively such processing may take place locally within the system if the system is designed for this purpose. The system furthermore comprises an interface section 610 for the disc unit and an interface section 612 for dispatching data via the network connection. The system comprises a buffer 614 which is present within the memory 604 and which serves for the temporary storage of a block of data sectors from the storage medium and for making data sectors therefrom available to a user application. A file system program for fetching data sectors from the file on the storage medium can be loaded into the memory. Furthermore, an application program which processes the data sectors for the user can also be loaded. For given applications the system may be provided with a second buffer 616, but that is not an essential aspect of the invention. In a system of this kind comprising two buffers, data sectors are applied from one buffer to the application while at the same time a next block of data sectors is fetched from the storage medium and placed in the other buffer. When one buffer is empty at a given instant, the data sectors of the other buffer which has meanwhile been filled are presented to the application and another block is fetched and stored in the one buffer. As a result, a continuous stream of data sectors can be applied to the user application. This is necessary, for example when the invention is used in a video-on-demand server where the file contains video information and the user should receive a continuous stream of video images. The system also comprises a bus 618 for exchanging commands and data between the various parts of the system.

The system in accordance with the invention is often arranged to serve more than one user simultaneously. For each user the system then comprises a buffer 614, possibly a buffer 616, and provides the transport to each individual user via the connection 608. The storage medium may comprise more than one file, it then being possible to present data sectors of each file to different users. In the case of the video-on-demand server, a given video film may be stored in one file, but other possibilities also exist. One video film could involve various files and one file could contain several video films.

Figure 7:
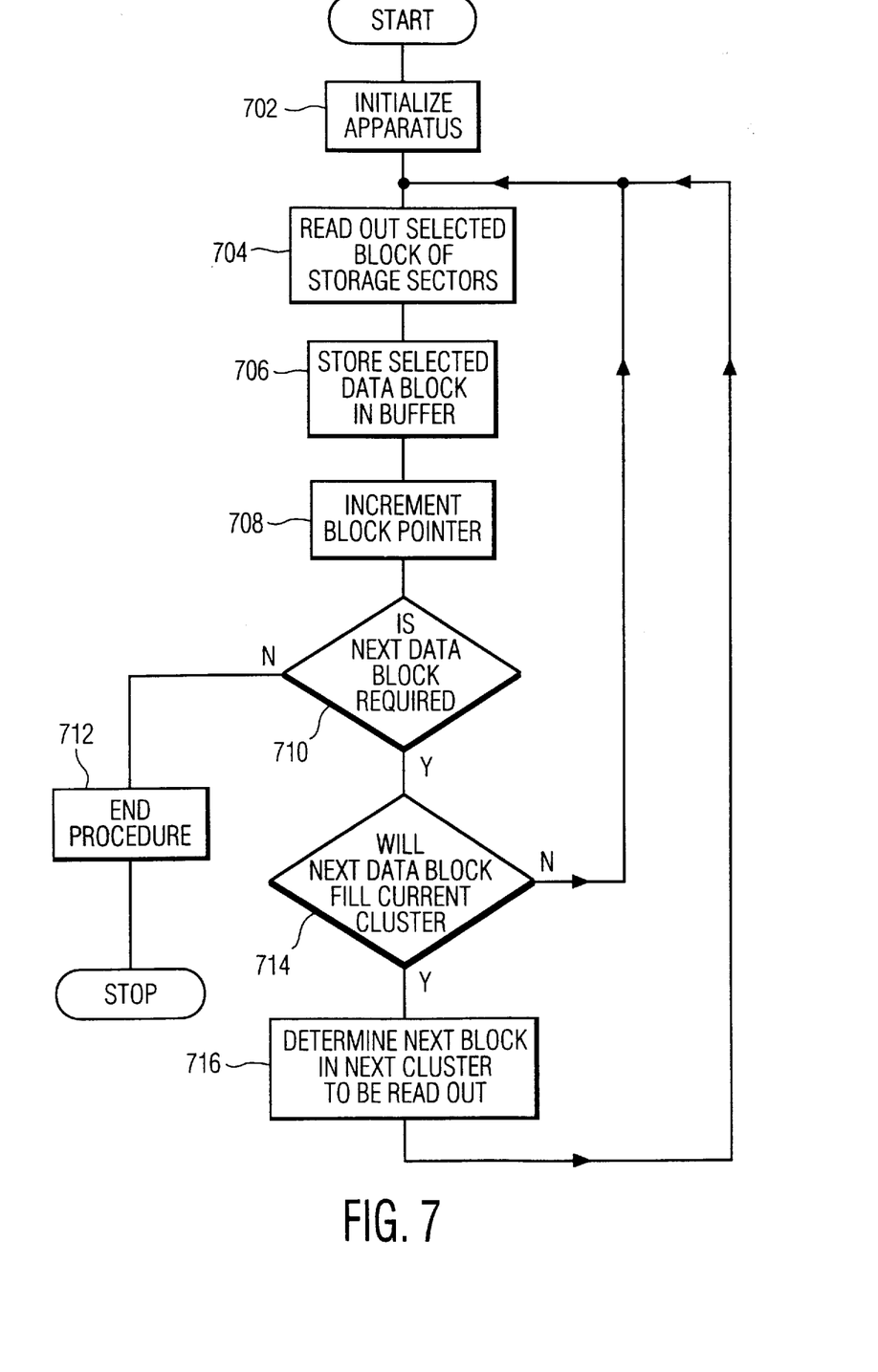
FIG. 7 shows a flow chart illustrating the main steps of the method in accordance with the invention for making data available from a file.

FIG. 7 shows a flow chart with the main steps of the method in accordance with the invention for making data from a file available. The step 702 is an initialization step and involves selection of the file, selection of the size of the block of data sectors to be fetched, and preparation of the necessary buffers. Furthermore, in this step the variable BLOCK POINTER is assigned to the storage sector as from which the first block of data sectors must be fetched. At the start this is the first storage sector for the sequential reading of the file. Upon a user request, for example the selection of a given scene, however, it is the storage sector where the desired data commence. In step 704 the block of storage sectors indicated by the block pointer is read and in step 706 the relevant data sectors are placed in the buffer. Subsequently, in step 708 the variable BLOCK POINTER is incremented, after which it indicates the storage sector directly subsequent to the block just read. In step 710 it is checked whether a next block of data sectors is required. If this is no longer the case, the procedure is terminated in step 712, the buffers and other space used then being released. If another block of data sectors is required, it is checked in step 714 whether as from the storage sector indicated by the block pointer a sufficient number of storage sectors is present in the current cluster so as to fill the next block. If so, a return is made to step 704 in order to fetch said next block and the process is continued as described above. If this is not the case, in step 716 it is calculated as from which storage sector in the next cluster the next block must be fetched in order to skip the data sectors already read. This calculation has been described in detail with reference to FIG. 3. This calculated storage sector is assigned to the variable BLOCK POINTER, after which a return is made to step 704 and subsequent steps for the fetching of the next block.

The procedure for a single user has been described above. In practice various of such processes will apparently be executed simultaneously for a plurality of users. Various possibilities exist as regards the synchronization of these processes. For example, at a given instant a list can be composed of blocks of data sectors to be fetched, after which all blocks of said list are fetched from the storage medium in one cycle so as to be arranged in the user buffers. During this cycle a new list of blocks to be fetched is composed and at the end of the cycle a new cycle is started so as to fetch the blocks of said new list.

I claim:

1. A method for use in a digital data processing device for storing data in a file in a storage device, the method comprising: composing the file as a series of logically successive clusters, and storing data sectors in a cluster one-to-one in physically successive storage sectors of the cluster such that the data sectors stored in the last K storage sectors of a given cluster are repeated in the first K storage sectors of a second cluster which directly succeeds the given cluster.

2. A digital data processing system for storing data in a file in a storage device, which system comprises a file system for storing the file which comprises a series of logically successive clusters made up of data sectors wherein data sectors in each cluster are stored one-to-one in physically successive storage sectors of the cluster, characterized in that the file system is arranged to repeat the data sectors stored in the last K storage sectors of a given cluster in the first K storage sectors of a second cluster which succeeds the given cluster.

3. An information carrier provided with a file with data, which file comprises a series of logically successive clusters, data sectors in each cluster being stored one-to-one in physically successive storage sectors of the cluster, characterized in that the data sectors in the last K storage sectors of a given cluster correspond to the data sectors in the first K storage sectors of a cluster which succeeds the given cluster.

4. A method of fetching data from a file in a storage device of a digital processor, which file comprises a logically successive series of clusters made up of data sectors, wherein the data sectors in each cluster are stored one-to-one in physically successive storage sectors of the cluster, the storage sectors in a given cluster being read in blocks in order to fetch each time some of the data sectors, characterized in that the method comprises:

reading a first block of storage sectors as from a desired arbitrary storage sector, detecting the number of storage sectors remaining between the end of the first block and the end of the relevant cluster, and jumping to a next desired storage sector in the logically next cluster if the detected number of storage sectors remaining is smaller than the number of storage sectors to be read in a next block.

5. A digital data processing system for making data available to a user, the system comprising a file system for managing a file in a storage device, which file comprises a series of logically successive clusters, data sectors in each cluster being stored one-to-one in physically successive storage sectors of the cluster, characterized in that the file system is arranged to manage the file in which the data sectors in the last K storage sectors of a given cluster correspond to the data sectors in the first K storage sectors of a cluster succeeding the given cluster.

6. A system as claimed in claim 5, comprising read means for reading the storage sectors in a given cluster by blocks, characterized in that the read means are arranged to read a first block of storage sectors as from a desired storage sector, and that the system comprises:

a detector for detecting the number of storage sectors remaining between the end of the first block and the end of the relevant cluster, and a jumping means for jumping to a next desired storage sector in the logically next cluster if the number of storage sectors remaining is smaller than the number of storage sectors to be read in a next block.

7. A system as claimed in claim 6, comprising a buffer for receiving the data sectors from a block of storage sectors to be read and for making the data thus derived available to a user, characterized in that the capacity of the buffer, expressed as a number of data sectors, at the most equals K+1.

8. A digital data processing system as claimed in claim 5 which comprises means for reading data in blocks of data sectors and starting with a desired arbitrary data sector of a cluster, and wherein the size of a cluster and the size of a data block are independent of one another.

9. A digital data processing system as claimed in claim 8 wherein said reading means read a first block of storage sectors from the desired arbitrary storage sector of a first cluster, means for detecting the number of storage sectors available between the end of the first block and the end of the first cluster, and wherein if the number of storage sectors available in the first cluster is smaller than the number of storage sectors to be read in a next data block, then the reading means read the next data sector from the next desired storage sector in the next logical cluster.

10. A method of storing and retrieving data from a file of a digital processor storage device wherein the file comprises a logically successive series of clusters made up of a plurality of data sectors, the method comprising:

storing the data sectors in each cluster one-to-one in physically successive storage sectors of the cluster such that the data sectors stored in the last K storage sectors of a given cluster are the same as the data sectors in the first K storage sectors of a second cluster which directly succeeds the given cluster, reading a first block of storage sectors from a desired arbitrary storage sector, detecting the number of storage sectors available between the end of the first block and the end of the relevant cluster, and jumping to a next desired storage sector in the logically next cluster if the detected number of storage sectors available is smaller than the number of storage sectors to be read in a next block of storage sectors.

11. The information carrier as claimed in claim 3 wherein the data sectors are stored in data blocks which directly follow one another without any significant spaces therebetween.

* * * * *